P. G. Gardiner.
Car Spring.
N° 107,035.  Patented Sept. 6, 1870.
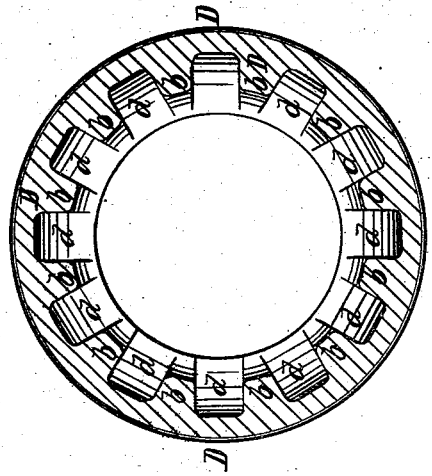
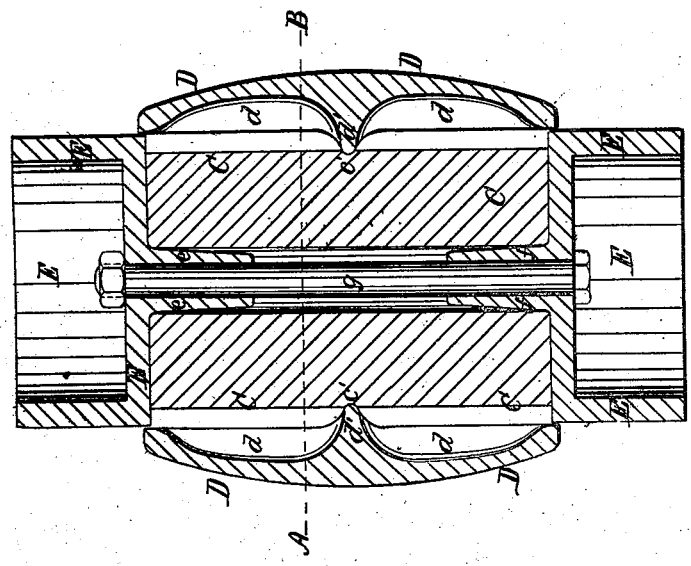
Witnesses:  Inventor:

UNITED STATES PATENT OFFICE.

PERRY G. GARDINER, OF NEW YORK, N. Y.

IMPROVEMENT IN CAR-SPRINGS.

Specification forming part of Letters Patent No. 107,085, dated September 6, 1870.

*To all whom it may concern:*

Be it known that I, PERRY G. GARDINER, of the city, county, and State of New York, have invented new and useful Improvements in Railroad-Car Springs; and I do hereby declare that the following is a full and exact description thereof, reference being had to the accompanying drawings, which make part of this my specification.

The nature of my invention consists, first, in combining and arranging an india-rubber cylinder concentrically within a hollow inclosing iron case or shell, open at the ends, and having on its inner periphery projecting ribs longitudinally and corresponding recesses, and a central horizontal ring, which encircles the rubber in a groove therein in such a manner as to provide space for the play and spread of the rubber under pressure, and at the same time hold it in place and afford it a gradually-increasing bearing as the spread or bulge of the rubber increases under increasing pressure; and, secondly, in constructing, in combination with the foregoing, two movable heads or bearings for the spring, in such a manner as that they shall move freely within the ends of the cylindrical iron case, and extend around a portion of the central bolt of the spring, so as always to press upon the ends of the rubber squarely and evenly in the line of the axis of the spring under pressure.

Figure I of the drawings represents a vertical cross-section through the central axis of the rubber cylinder and of the iron case, and heads or bearings of the spring, and the bolt which holds the spring together. Fig. II is a horizontal section of the rubber cylinder and iron case on the line A A of Fig. I.

In both figures similar letters represent similar parts.

The spring derives its elasticity from the india-rubber cylinder C, which is of one piece, and does not differ from the ordinary rubber cylinder spring, excepting in the groove which runs around it at the middle, as seen at C'. This rubber cylinder I place within an iron shell or case, D, which in the present case is externally of an elliptical form in its vertical direction, and circular horizontally, and it is a little longer than the rubber cylinder, so as to project beyond it at either end, and it is open at both ends to receive the heads or bearings of the spring. Upon the inner face of the shell D are ribs $b$, extending along the inner face of the case, but uniting with the horizontal ring or circular flange $d'$ in the middle, thus dividing the chambers or recesses $d\ d$ in the shell equally in a horizontal as well as vertical direction. The diameter of the rubber cylinder is less than that of the space within the faces of the ribs, so that there will always be an open space between the periphery of the rubber and the faces of the ribs, within which the rubber finds room for bulging under pressure; and the operation is such that if the pressure is increased so as to bulge the rubber beyond the faces of the ribs the rubber is then forced into the chambers or recesses between the ribs. When the spring has come home—that is, its extent of yielding is exhausted—the rubber fills all the surrounding spaces, and is supported by the faces of the ribs, by the sides and faces of the recesses, and by the horizontal ring. In actual use, it is not intended that the spring shall thus come home and find its dead-point; but its elastic action will always remain alive or unexhausted, and the support and bearings afforded to the rubber by the ribs and the sides and the faces of the recesses will be in a gradual increasing progression in the ratio of the increase of the pressure. The projecting ring in the middle operates to hold the rubber cylinder in its proper position within the case, so as not to work up or to be displaced laterally, which it might do in the open space between it and the faces of the ribs but for this provision. The spread of the rubber under pressure begins always at the middle line, where the ring surrounds and supports it, and advances equally in either direction above and below from the ring; and thus the ring operates in a twofold manner by holding the rubber in its exact place, and by affording it support, and is therefore of great utility.

The heads or bearings E E of the spring are formed precisely alike. They are circular and hollow, and are fitted to play closely but freely within the open ends of the iron case. At the centers of the closed ends of the heads is an opening, which is flanged inward, so as to form a short tube surrounding the bolt, as seen at $ef$, by which the play of the heads is made to act in the line of the axis of the spring. The bolt $g$ passes through the central opening in the rubber cylinder, which opening is large enough to allow the free movement of the flanged portions e f of the heads. The bolt is fastened to the head by means of an upset at one end and screw and nut at the other. By screwing the nut down it brings the heads within the open ends of the case, and compressing the rubber somewhat, so as to set the spring for use. This mode of construction produces a safe, powerful, and durable spring, easy in its action, and at a moderate expense.

Having thus described my improvements and the manner of constructing the same, what I claim therein as my invention, and for which I desire Letters Patent, is—

1. The construction of a railroad-car spring by the combination of an india-rubber cylinder with an iron shell or case, in which the interior face is divided longitudinally into recesses or chambers by the projecting ribs, and horizontally by the encircling ring, whereby space is afforded for the play of the rubber, and it is also held in its place, and at the same time receives support from gradually-increasing bearings, arranged and operating substantially as described.

2. The combination of the heads E E, constructed as described, with the other portions of the spring, so as to move freely within the open ends of the shell, and slide upon the bolt, always in a position parallel with each other and with the line of the axis of the spring.

P. G. GARDINER.

Witnesses:
  J. B. STAPLES,
  S. A. STODDER.